US008397012B2

(12) United States Patent
Jewell et al.

(10) Patent No.: US 8,397,012 B2
(45) Date of Patent: Mar. 12, 2013

(54) DATA STORAGE SYSTEMS (75) Inventors: Colin Robert Jewell, Southampton (GB); Robert Bruce Nicholson, Southsea (GB); Francis Michael Huw, Compton (GB)

(73) Assignee: International Business Machines Corporation, Armonk, NY (US)

( * ) Notice: Subject to any disclaimer, the term of this patent is extended or adjusted under 35 U.S.C. 154(b) by 1874 days.

(21) Appl. No.: 10/929,321

(22) Filed: Aug. 30, 2004

(65) Prior Publication Data
US 2005/0132150 A1    Jun. 16, 2005

(51) Int. Cl.
*G06F 12/00* (2006.01)

(52) U.S. Cl. ............ 711/102; 711/4; 711/100; 711/161; 711/162; 711/165; 714/2; 714/14; 714/22

(58) Field of Classification Search .................. 711/100, 711/102, 4, 161, 162, 165; 714/2, 14, 22
See application file for complete search history.

(56) References Cited

U.S. PATENT DOCUMENTS

| 5,274,827 | A | * | 12/1993 | Haggerty et al. ............. 365/226 |
| 5,404,539 | A | * | 4/1995 | Onozaki ........................ 710/240 |
| 5,515,500 | A | * | 5/1996 | Mizuno et al. .................... 714/7 |
| 5,535,399 | A | * | 7/1996 | Blitz et al. ......................... 714/6 |
| 5,799,200 | A | * | 8/1998 | Brant et al. .................... 713/340 |
| 6,877,049 | B1 | * | 4/2005 | Myers .............................. 710/56 |
| 7,761,681 | B2 | | 7/2010 | Jewell et al. |
| 2002/0030687 | A1 | * | 3/2002 | Nakatsuka et al. ........... 345/534 |
| 2002/0078399 | A1 | * | 6/2002 | Caulkins ......................... 714/24 |
| 2002/0080771 | A1 | * | 6/2002 | Krumel ........................... 370/352 |
| 2002/0083368 | A1 | * | 6/2002 | Abe et al. ........................ 714/24 |
| 2005/0117418 | A1 | | 6/2005 | Jewell et al. |

FOREIGN PATENT DOCUMENTS

JP    58205994 A    * 12/1983

* cited by examiner

*Primary Examiner* — Midys Rojas
(74) *Attorney, Agent, or Firm* — Yudell Isidore Ng Russell PLLC (57) ABSTRACT

A data storage subsystem includes a volatile memory in which stored data can be denoted as being data that should be preserved in the event of an interruption in the power supply to the volatile memory. The available capacity for such data storage is dynamically allocated between multiple firmware client components of the storage subsystem, such that each client component has its own (varying) allocation of the available capacity. A higher priority for the storage of such data is given to client components on which other client components depend, such as lower layers of the software stack, thereby allowing them to get a larger share of the available capacity for such data storage when needed and complete their input/output requests faster.

7 Claims, 3 Drawing Sheets

DATA STORAGE SYSTEMS

PRIORITY CLAIM

This application claims priority of United Kingdom Patent Application No. 0320141.5, filed on Aug. 28, 2004, and entitled, "Data Storage Systems."

BACKGROUND OF THE INVENTION

1. Technical Field

The present invention relates to data storage systems, and more particularly to storage subsystems in which the contents of a volatile memory are arranged to be preserved in the event of a power failure so as to make the contents of the volatile memory persistent across power failures.

2. Description of Related Art

Many computer systems store data in volatile memories, for example because such memories are usually faster and smaller than nonvolatile storage devices. However, a disadvantage to the use of volatile memories is that the data stored in them is lost if the volatile memory loses power, such as could occur in the event of a power supply failure or interruption.

It is known therefore to provide in such systems a means for preserving data stored in the volatile memory in the event of a power supply failure or interruption. This could comprise, e.g., a backup power supply, such as a battery, for the volatile memory. In other arrangements, the storage system is operable to dump the contents of the volatile memory to a nonvolatile memory in the event that a power failure is detected using an auxiliary or backup power supply such as a battery. This preserves the data in the volatile memory and allows it to be retrieved from where it was "dumped" to once power is restored. U.S. Pat. No. 5,748,844 describes one such prior art system.

Such "protected" volatile memory is often referred to as "persistent" memory.

In such persistent memory arrangements, there will typically be a finite capacity of data in the volatile memory that can be preserved in the event of a power supply failure or interruption, i.e. the volume of persistent memory will be restricted. This could be because, for example, the volatile memory has a data capacity that is larger than the amount of data that can be "dumped" to a nonvolatile memory using the provided temporary power supply (which may be desirable in some circumstances, such as, for example, where a relatively large volatile memory capacity is required, but not all the data stored in the volatile memory at any given time may need to be preserved across power interruptions).

In such arrangements, data stored in the volatile memory is typically therefore denoted as either being data that should be preserved (e.g. written to a nonvolatile memory) in the event of a power interruption, or as data that does not need to be so preserved. Data that will be preserved in the event of a power interruption is typically referred to as "hardened" data (with the data that does not need to be preserved then being "soft" data). The marking of data as being "hardened" data is usually done, e.g., by firmware in a storage subsystem controller. When a power interruption is detected, the data marked as "hardened" is then preserved, e.g. by transferring it to a nonvolatile memory.

Thus, typically, in a persistent memory arrangement, the volatile memory will contain some data that is "hardened", i.e. to be preserved when a power failure or interruption occurs, and other data that is "soft", i.e. that will be lost when a power failure or interruption occurs. There will also typically be a maximum amount of hardenable data that can be stored in the volatile memory (i.e. persistent memory capacity).

SUMMARY OF THE INVENTION

The Applicants have recognised that in situations where the amount of volatile memory that can be "hardened" is limited, then there may need to be some form of selection as to which data is to be hardened, for example, where it would ideally be desirable for more than the permitted amount of data to be hardened, or where some existing hardened memory has to be softened (e.g. to allow normal storage subsystem operation to resume). This situation could be exacerbated where there are, for example, plural "clients" that can use or are using the storage subsystem, each with conflicting demands for "hardened" memory capacity.

It should be appreciated in this regard, that the "users" of hardened data in storage subsystems of the type that the present invention is applicable to will be the "components" of the storage subsystem firmware that implement the basic data storage functions, such as fast-write caching, RAID5 APU or copy services. For example, data storage subsystems of the type that the present invention is applicable to may typically contain firmware client components in the form of a number of independent software layers performing, e.g., copy services, caching and RAID storage, each of which may need to use hardenable memory. Such firmware components can be viewed as client components of the storage subsystem firmware (with the persistent memory management components of the storage subsystem firmware accordingly being "server components").

It is these firmware client components of the storage subsystem that actually harden and soften data and use hardenable data for their operations. This should be contrasted with external "clients" of the storage subsystem that will make input/output requests to the storage subsystem but will not themselves directly control or use hardened data (rather the control and use of hardened data will be decided and done by the firmware client components of the storage subsystem as they implement the input/output requests of the external client applications of the storage subsystem, independently of the external client applications).

While it would be possible simply to allocate the available amount of "hardenable" (persistent) memory on an, e.g., first-come, first-served basis, or to, e.g., statically divide the entire memory pool between the storage subsystem client components in fixed proportions, the Applicants have recognised that such schemes may not permit the most efficient use of the available hardenable memory, and/or the fastest return to normal operation where existing hardened data needs to be softened for that to take place.

For example, data storage subsystems of the type that the present invention is applicable to may typically contain, as discussed above, firmware client components in the form of a number of independent software layers performing, e.g., copy services, caching and RAID storage, each of which may need to use hardenable memory and which without access to sufficient hardenable memory (e.g. sufficient hardenable memory to process one input/output request) may become deadlocked.

Furthermore, these software layers are usually effectively stacked one on top of each other, with each layer effectively operating to write to the layer or layers below (e.g. a fastwrite cache will cache data for and write that data to, a RAID array below it). This can mean that if the lower layers cannot process data, e.g., because they do not have access to sufficient hardenable memory, the layers above them will also become deadlocked.

The Applicants have recognised that in situations such as these it may not always be appropriate to allocate the available persistent memory on an, e.g., first-come, first-served basis, as that may not avoid deadlock situations of the type discussed above.

Thus, the present invention includes a data storage subsystem that includes a volatile memory in which stored data can be denoted as being data that should be preserved in the event of an interruption in the power supply to the volatile memory. The available capacity for such data storage is dynamically allocated between multiple firmware client components of the storage subsystem, such that each client component has its own (varying) allocation of the available capacity. A higher priority for the storage of such data is given to client components on which other client components depend, such as lower layers of the software stack, thereby allowing them to get a larger share of the available capacity for such data storage when needed and complete their input/output requests faster.

The above, as well as additional purposes, features, and advantages of the present invention will become apparent in the following detailed written description.

BRIEF DESCRIPTION OF THE DRAWINGS

A number of preferred embodiments of the present invention will now be described by way of example only and with reference to the accompanying drawings, in which.

DETAILED DESCRIPTION OF THE PREFERRED EMBODIMENT

According to a first aspect of the present invention, there is provided an apparatus for controlling a data storage subsystem which has a volatile memory in which stored data can be denoted as being data that should be preserved in the event of an interruption in the power supply to the volatile memory. The apparatus includes means for controlling the storage in the volatile memory of data that is denoted as being data that should be preserved in the event of an interruption in the power supply to the volatile memory on the basis of the nature of the data to be stored and/or the nature of the client component requesting storage of the data in the volatile memory.

According to a second aspect of the present invention, there is provided a method of operating a data storage subsystem comprising a volatile memory in which stored data can be denoted as being data that should be preserved in the event of an interruption in the power supply to the volatile memory. The method includes controlling the storage in the volatile memory of data that is denoted as being data that should be preserved in the event of an interruption in the power supply to the volatile memory on the basis of the nature of the data to be stored and/or the nature of the client component requesting storage of the data in the volatile memory.

According to a third aspect of the present invention, there is provided an apparatus for use in a data storage subsystem. The apparatus includes a volatile memory, means for preserving data stored in the volatile memory in the event of an interruption in the power supply to the volatile memory, means for denoting data stored in the volatile memory as being data that should be preserved in the event of a power supply interruption, and means for controlling the storage in the volatile memory of data that is denoted as being data that should be preserved in the event of an interruption in the power supply to the volatile memory on the basis of the nature of the data to be stored and/or the nature of the client component requesting storage of the data in the volatile memory.

In the present invention, access to the available hardenable data capacity (persistent memory) of the data storage subsystem is controlled based on the nature of the data being stored and/or the nature of the client component requesting storage of the data (i.e. use of the hardenable data capacity in the volatile memory). This allows such data capacity to be allocated dynamically and more effectively in use.

The way that the storage of hardened data in the volatile memory is controlled can be selected as desired. Preferably, the data is either allowed to be stored in the volatile memory or not, based on the nature of the data being stored and/or the nature of the client component requesting storage of the data. In a particularly preferred embodiment, the available hardenable data capacity (persistent memory) is allocated to the respective data types, client components, etc., based on the nature of the data being stored and/or the nature of the client component requesting storage of the data.

In a particularly preferred embodiment, the firmware client components using the volatile memory are given priority rankings for access to the hardenable memory capacity in the volatile memory, and the access to that memory is controlled based on the priority allocations. Most preferably, different priority levels for access to hardened memory are allocated to, e.g., different types of data and/or different client components, and the available amount of hardenable memory is then allocated, and/or the softening of existing hardened memory is then controlled, on the basis of the priority allocations.

It is believed that such an arrangement may be new and advantageous in its own right.

Thus, according to a fourth aspect of the present invention, there is provided an apparatus for controlling a data storage subsystem which comprises a volatile memory in which stored data can be denoted as being data that should be preserved in the event of an interruption in the power supply to the volatile memory. The apparatus includes means for allocating to different client components using the volatile memory different priority levels for access to storage capacity in the volatile memory for data that is denoted as being data that should be preserved in the event of an interruption in the power supply to the volatile memory.

According to a fifth aspect of the present invention, there is provided a method of operating a data storage subsystem comprising a volatile memory in which stored data can be denoted as being data that should be preserved in the event of an interruption in the power supply to the volatile memory. The method includes the step of allocating to different client components using the volatile memory different priority levels for access to storage capacity in the volatile memory for data that is denoted as being data that should be preserved in the event of an interruption in the power supply to the volatile memory.

According to a sixth aspect of the present invention, there is provided an apparatus for use in a data storage subsystem. This apparatus includes a volatile memory, means for preserving data stored in the volatile memory in the event of an interruption in the power supply to the volatile memory, means for denoting data stored in the volatile memory as being data that should be preserved in the event of a power supply interruption, and means for allocating to different client components using the volatile memory different priority levels for access to storage capacity in the volatile memory for data that is denoted as being data that should be preserved in the event of an interruption in the power supply to the volatile memory.

These aspects of the invention can include any one or more or all of the preferred and optional features of the present invention described herein.

The way that firmware client components of the storage subsystem (users of the volatile memory) are prioritised for hardened data capacity use and allocation can be selected as desired. In a particularly preferred embodiment, client components of the storage subsystem that require hardenable memory to ensure data integrity are given a higher priority than client components that only require hardenable memory for increased performance, which client components are in turn preferably given a higher priority than any client components for which hardenable memory is neither required for data integrity nor permits increased performance.

It is also particularly preferred for the access to and allocation of the available hardenable memory (and accordingly any priority allocations) to also or instead be based on the dependencies between client components of the volatile memory (or at least of the storage subsystem incorporating the volatile memory) for processing their, e.g., input/output requests, and/or (accordingly) when softening their hardened data. Thus, for example, if a first client component of the storage subsystem is dependent on a second client component to process its write (or read) operations, the second client component is preferably allocated a higher priority for the hardenable memory allocation. This has the advantage, e.g., that by allowing the second client component preferential access to hardenable memory, the second client component may be able to process its input/output requests faster, which in turn will then allow the first client component to process its input/output requests (which operations may, e.g., need to be completed to allow the first client component to successfully soften its existing hardened data). This therefore helps to avoid deadlock situations arising, and can, e.g., help to accelerate the softening of existing hardened data.

As discussed above, the Applicants have recognised that such "dependency" situations can in particular arise where upper software layers in a client component "stack" are dependent on the ability of lower layers in the client component stack to process input/output requests to be able themselves to soften their hardened data. It is accordingly preferred in such arrangements for the "lower layer" client components on which other client components depend to be allocated a higher priority for hardenable memory allocation, so as to allow them to complete their I/O requests faster and accordingly permit client component layers above them to soften their hardened data. Thus, preferably, the lower layers in the client component "stack" are given preferential access to the available hardenable memory, particularly where it is necessary to soften existing hardened data.

It is again believed that these techniques are both new and advantageous in their own right.

Thus, according to a seventh aspect of the present invention, there is provided an apparatus for controlling a data storage subsystem which comprises a volatile memory in which stored data can be denoted as being data that should be preserved in the event of an interruption in the power supply to the volatile memory. This apparatus includes means for controlling the storage in the volatile memory of data that is denoted as being data that should be preserved in the event of an interruption in the power supply to the volatile memory by different firmware client components of the storage subsystem on the basis of the dependency of at least one of the client components on another client component or components for processing its input/output requests to the storage subsystem.

According to an eighth aspect of the present invention, there is provided a method of operating a data storage subsystem comprising a volatile memory in which stored data can be denoted as being data that should be preserved in the event of an interruption in the power supply to the volatile memory. This method includes the step of controlling the storage in the volatile memory of data that is denoted as being data that should be preserved in the event of an interruption in the power supply to the volatile memory by different firmware client components of the storage subsystem on the basis of the dependency of at least one of the client components on another client component or client components for processing its input/output requests to the storage subsystem.

According to a ninth aspect of the present invention, there is provided an apparatus for use in a data storage subsystem. This apparatus includes a volatile memory, means for preserving data stored in the volatile memory in the event of an interruption in the power supply to the volatile memory, means for denoting data stored in the volatile memory as being data that should be preserved in the event of a power supply interruption; and means for controlling the storage in the volatile memory of data that is denoted as being data that should be preserved in the event of an interruption in the power supply to the volatile memory by different firmware client components of the storage subsystem on the basis of the dependency of at least one of the client components on another client component or client components for processing its input/output requests to the storage subsystem.

As will be appreciated by those skilled in the art, these aspects and embodiments of the invention can include any one or more or all of the preferred and optional features of the present invention discussed herein.

Most preferably the access (or otherwise) to hardenable data capacity by a client component (and preferably by all of the client components), and/or the amount of available hardenable data capacity allocated to a client component (and preferably to each of the client components), is based on the relevant client component dependencies of the (or each) client component. In a particularly preferred embodiment, the storage of hardened data in the volatile memory is controlled based on the dependencies of more than one (and preferably of all) of the client component on another client component or components (and preferably on all of the other client components) for processing their input/output requests to the storage subsystem.

It will be appreciated from the above that it is preferred in these arrangements for the available hardenable (persistent) memory to be assigned in a priority order that best enables users of the hardened memory to soften hardened data when necessary (which could, for example be necessary when the amount of hardened data needs to be reduced to a quantity that matches or is below the available hardenable memory).

It is again believed that such a technique is both new and advantageous in its own right.

Thus, according to a tenth aspect of the present invention, there is provided an apparatus for controlling a data storage subsystem which comprises a volatile memory in which stored data can be denoted as being data that should be preserved in the event of an interruption in the power supply to the volatile memory. This apparatus includes means for controlling the storage in the volatile memory of data that is denoted as being data that should be preserved in the event of an interruption in the power supply to the volatile memory by different firmware client components of the storage subsystem on the basis of the ability of a or more than one of the client components to reduce the amount of data that it or they have stored in the volatile memory that is denoted as being data that should be preserved in the event of an interruption in the power supply to the volatile memory.

According to an eleventh aspect of the present invention, there is provided a method of operating a data storage subsystem comprising a volatile memory in which stored data can be denoted as being data that should be preserved in the event of an interruption in the power supply to the volatile memory. This method includes the step of controlling the storage in the volatile memory of data that is denoted as being data that should be preserved in the event of an interruption in the power supply to the volatile memory by different firmware client components of the storage subsystem on the basis of the ability of a or more than one of the client components to reduce the amount of data that it or they have stored in the volatile memory that is denoted as being data that should be preserved in the event of an interruption in the power supply to the volatile memory.

According to a twelfth aspect of the present invention, there is provided an apparatus for use in a data storage subsystem. This apparatus includes a volatile memory, means for preserving data stored in the volatile memory in the event of an interruption in the power supply to the volatile memory, means for denoting data stored in the volatile memory as being data that should be preserved in the event of a power supply interruption, and means for controlling the storage in the volatile memory of data that is denoted as being data that should be preserved in the event of an interruption in the power supply to the volatile memory by different firmware client components of the storage subsystem on the basis of the ability of a or more than one of the client components to reduce the amount of data that it or they have stored in the volatile memory that is denoted as being data that should be preserved in the event of an interruption in the power supply to the volatile memory.

These aspects and embodiments of the invention can again include any one or more or all of the preferred and optional features of the present invention discussed herein.

In a particularly preferred embodiment of the present invention, the available hardenable memory is allocated firstly to client components that need persistent memory to ensure data integrity, and then once those client components' needs have been satisfied, to client components on which other client components are dependent to be able to soften their existing hardened data. Then, as the available pool of hardenable memory increases, any hardenable memory capacity not required for these client components is allocated to the remaining client components in an order which enables increased (and preferably best) performance of the system.

In another particularly preferred embodiment, when the permitted amount of hardened data that can be stored in the volatile memory is at its maximum value, the available hardened data capacity is divided among the client components of the storage subsystem according to fixed, preferably predetermined, proportions, but when the amount of hardened data capacity is less than the maximum amount, the available hardened data capacity is allocated dynamically using a priority scheme of the type discussed above.

The way that the hardened data in the volatile memory is preserved in the event of a power supply failure can be selected as desired. It could, for example, be so preserved by using a temporary power supply, such as a battery, to write the hardened data to a nonvolatile memory when a (main) power supply interruption or failure is detected.

The present invention can be used in any data storage subsystem where the contents of a volatile memory can be made persistent across power interruptions and failures. Indeed, most storage subsystems need to allocate a finite amount of persistent memory between multiple client components. Thus the present invention is applicable to storage subsystems in general, and to, for example, applications such as, write caching, RAID5 atomic parity update and copy services.

The apparatus of the present invention can be implemented in the storage subsystem as desired. In a particularly preferred embodiment, it is in the form of a storage adapter for a storage subsystem which comprises, e.g., the volatile memory, means for preserving data in the volatile memory, and a processor for carrying out the various functions described herein.

Although the present invention has been described with particular reference to its use in data storage subsystems, as will be appreciated by those skilled in the art, aspects of the present invention at least are generally applicable to any situation where it is necessary to allocate a (changing) pool of finite resource to clients of the resource in which the clients can, e.g., depend on each other to reduce their use of the pool.

Thus, according to a thirteenth aspect of the present invention, there is provided an apparatus for controlling a system in which a pool of finite resource is shared between plural clients that wish to use the resource. This apparatus includes means for controlling access to the pool of resource by clients wishing to use the resource on the basis of the dependency of at least one of the clients on another client or clients for its ability to use the resource.

According to a fourteenth aspect of the present invention, there is provided a method of operating a system in which a pool of finite resource is shared between plural clients that wish to use the resource. This method includes the step of controlling access to the pool of resource by clients wishing to use the resource on the basis of the dependency of at least one of the clients on another client or clients for its ability to use the resource.

According to a fifteenth aspect of the present invention, there is provided an apparatus for controlling a system in which a pool of finite resource is shared between plural clients that wish to use the resource. This apparatus includes means for controlling access to the pool of resource by clients wishing to use the resource on the basis of the ability of one or more of the clients to reduce their use of the resource.

According to a sixteenth aspect of the present invention, there is provided a method of operating a system in which a pool of finite resource is shared between plural clients that wish to use the resource. This method includes the step of controlling access to the pool of resource by clients wishing to use the resource on the basis of the ability of a or more than one of the clients to reduce their use of the resource.

These aspects and embodiments of the invention can again include any one or more or all of the preferred and optional features of the present invention discussed herein.

The methods in accordance with the present invention may be implemented at least partially using software e.g. computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a computer software carrier comprising such software which when used to operate a data storage subsystem or an apparatus for controlling such a system comprising data processing means causes in conjunction with said data processing means said system or apparatus to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Figure 1:
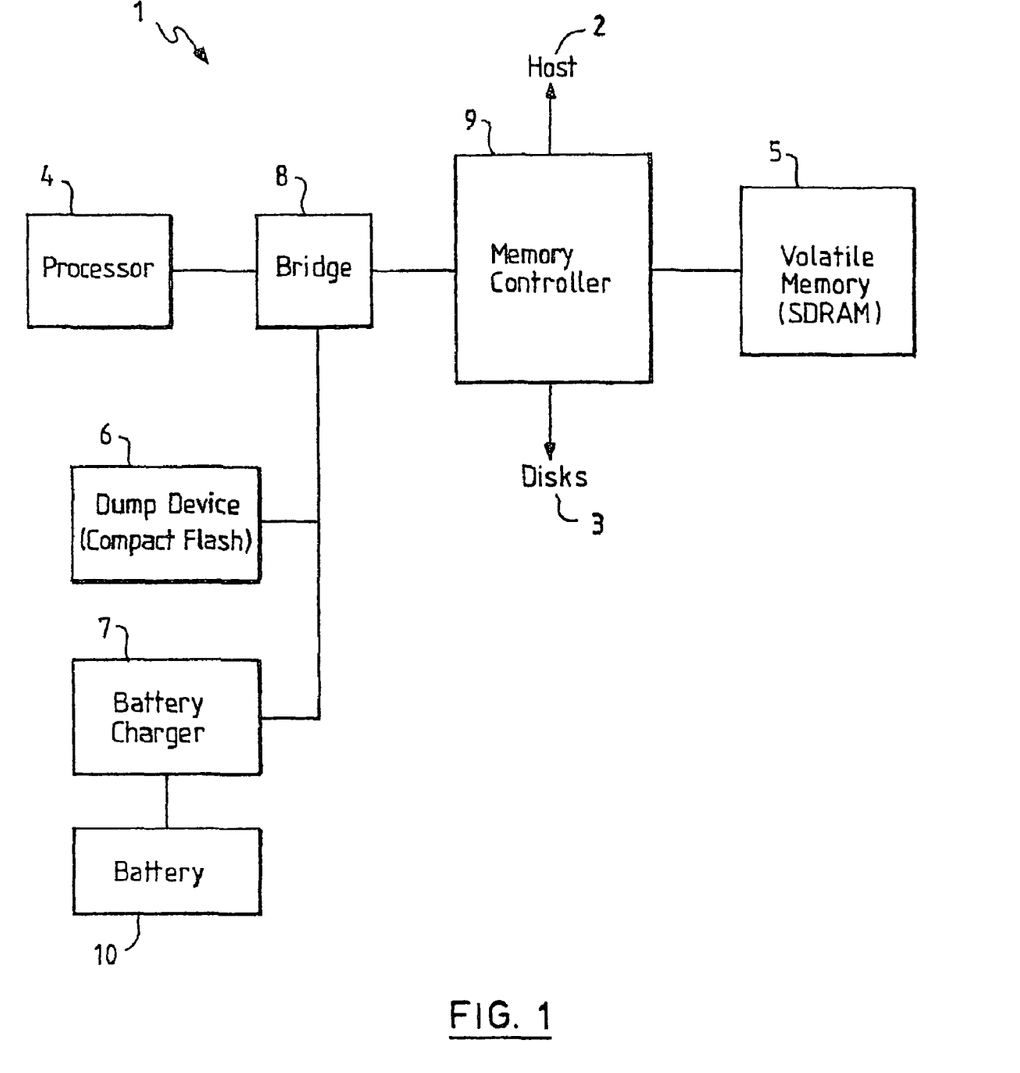
FIG. 1 shows schematically a storage adapter that can be used in accordance with the present invention.

With reference now to the figures, and particularly to FIG. 1, which shows schematically the layout of a storage adapter 1 for use in a data storage subsystem that can be operated in accordance with the present invention. The storage adapter 1 is basically operable to interface between a host microprocessor system 2 and a main nonvolatile memory disk array 3 and can, e.g., be in the form of an adapter "card", as is known in the art. The storage adapter 1 operates to input and output data from the host system 2 to the hard disk array 3.

The storage adapter 1 includes a controlling processor 4, a volatile memory 5 (which in this embodiment is in the form of an SDRAM (Synchronous Dynamic Random Access Memory), although other forms of volatile memory could be used, if desired), and a nonvolatile memory "dump device" 6 in the form of a flash memory, such as a compact flash device. (Other forms of nonvolatile memory, such as a "micro" disk drive, could be used if desired. The basic requirement for the nonvolatile memory 6 is that it should be a compact and low-power device that can be run using power supplied by a temporary power supply of the storage adapter (see below)).

The storage adapter 1 also includes a battery charger 7, a bridge 8 for interfacing between, inter alia, the processor 4, volatile memory 5, nonvolatile memory 6, and a PCI bridge and memory controller unit 9 that interfaces between and connects the host system 2 and the hard disk array 3.

The storage adapter 1 includes a temporary power supply in the form of a battery 10. Other forms of temporary power supply would be possible, if desired. This battery 10 is used, as will be discussed further below, to provide sufficient power to the storage adapter 1 to allow data from the volatile memory 5 to be written to the nonvolatile memory 6 of the storage adapter under the control of the processor 4 in the event of an interruption or failure in the main power supply to the storage adapter 1, i.e. to preserve data stored in the volatile memory in that event. The battery 10 should accordingly have sufficient capacity to provide power for this purpose, but it should be noted that it is not necessary for the battery 10 to, and indeed it is preferred for this temporary power supply not to, provide power for operating and writing data to the disk array 3 of the storage subsystem.

In normal operation, the storage adapter 1 operates to receive input and output requests from the host system 2, and to accordingly store data in or retrieve data from the disk array 3 for the host system 2. The actual data storage and retrieval is implemented as is known in the art, by firmware "client" components of the storage adapter 1, that implement functions on the basic storage, such as fast-write caching RAID5 APU and copy services in order to carry out the input and output requests from the host system 2. As part of this process, as is known in the art, the storage adapter 1 firmware may temporarily store data received from the host system 2 in the volatile memory 5, before that data is transferred to the disk array 3. As discussed above, in the event that there should be a power supply failure to the storage adapter 1 and hence volatile memory 5, the data stored in the volatile memory 5 would be lost. This can be disadvantageous.

The storage adapter 1 accordingly includes, as discussed above, a temporary power supply in the form of a battery 10, which can be used to write data from the volatile memory 5 to the nonvolatile memory dump device 6 in the event of a main power supply failure, so as to preserve that data. To facilitate this, the storage adapter 1 includes hardware to detect the loss of system power and then switch to the temporary power supply whilst maintaining power to the necessary components of the storage adapter.

The data in the volatile memory 5 which must survive (i.e. persist) across a main power supply interruption or failure is marked as "hardened" by the adapter firmware. Then, when a power supply interruption is detected, the adapter 1 switches to the temporary power supply, and dumps the parts of the volatile memory 5 which have been "hardened" to the nonvolatile dump device 6. When the data "dump" has been completed, the temporary power supply is turned off. When system power returns, the data from the dump device 6 is read back into the volatile memory 5 and normal operation resumed. The discharged temporary power supply of battery 10 is then recharged using the battery charger 7. It should be noted here that a data "dump" in these circumstances will typically only take two or three minutes, whereas to fully recharge the battery 10 may take of the order of one hour.

Data that is marked as "hardened" in the volatile memory 5 can also be "softened" by the adapter firmware, for example, when that data is no longer required to persist over power outages.

The processor 4 of the storage adapter 1 also includes means for determining the quantity of data in the volatile memory 5 that can be protected by the temporary power supply of battery 10 at any given time, and accordingly to control the amount of data in the volatile memory 5 that can be stored as "hardened" data.

The processor 4 does this by first determining the state of the temporary power supply of battery 10. It does this using a predetermined table of the charging and discharging characteristics of the battery 10 and by timing how long the battery 10 is charged or discharged for. The state of the battery 10 is updated every few minutes, and the current state of charge is recorded in a nonvolatile storage device in the form of an EEPROM mounted on the battery 10 (so that this information also survives any main power supply interruption).

The processor 4 then uses the current state of charge of the battery 10 to determine the amount of hardened data that can be "dumped" to the nonvolatile dump device 6 using the temporary power supply battery 10 in its current state. The relationship between the current state of the battery 10 and the amount of hardened data that can be dumped to the nonvolatile dump device 6 is again predetermined, using, for example, the known characteristics and power usage requirements for writing to the nonvolatile memory dump device 6. It could be based on, e.g., the amount of time that the battery 10 can power the adapter for and the amount of data that can be written to the nonvolatile memory in that time.

Where the nonvolatile dump device 6 is a flash memory device, as in the present embodiment, there will typically be a linear relationship between the state of charge of the battery 10 and the amount of data that can be dumped. More sophisticated determinations may be necessary in the case of, e.g., microdisk drives, since in that case the write rate to the microdisk drive will not be constant and so the relationship between the state of charge and the amount of data that can be dumped may not be linear.

As part of its calculation, the processor 4 also determines a "safety" margin, based on the known accuracy of the estimation of the time the battery 10 can power the storage adapter 4 for, and the accuracy of the estimation of the amount of data that can be dumped in that time.

In this way, the processor 4 determines the amount of data that can safely be stored in the volatile memory 5 as hardened data at any given time.

The processor 4 then uses the determined amount of data that can be safely hardened in the volatile memory 5 to control the hardening of data in that memory. The determined permitted amount of hardened data will be referred to herein as the "guarantee", and the processor 4 operates so as to try to maintain the amount of hardened data in the volatile memory 5 below this guarantee. Thus, for example, since immediately after a power supply failure, the quantity of hardened data in the volatile memory 5 will exceed the amount of hardened data which can be protected by the battery 10 (since it will have been discharged), then the processor 4 will instruct firmware client components of the storage subsystem using hardened data in the volatile memory 5 to soften their data until the quantity of hardened data is less than the current "guarantee", at which point the client components are permitted to use the smaller quantity of available hardened memory as usual. As the battery 10 recharges, the guarantee level is raised accordingly, thereby allowing more data to be hardened.

Figure 2:
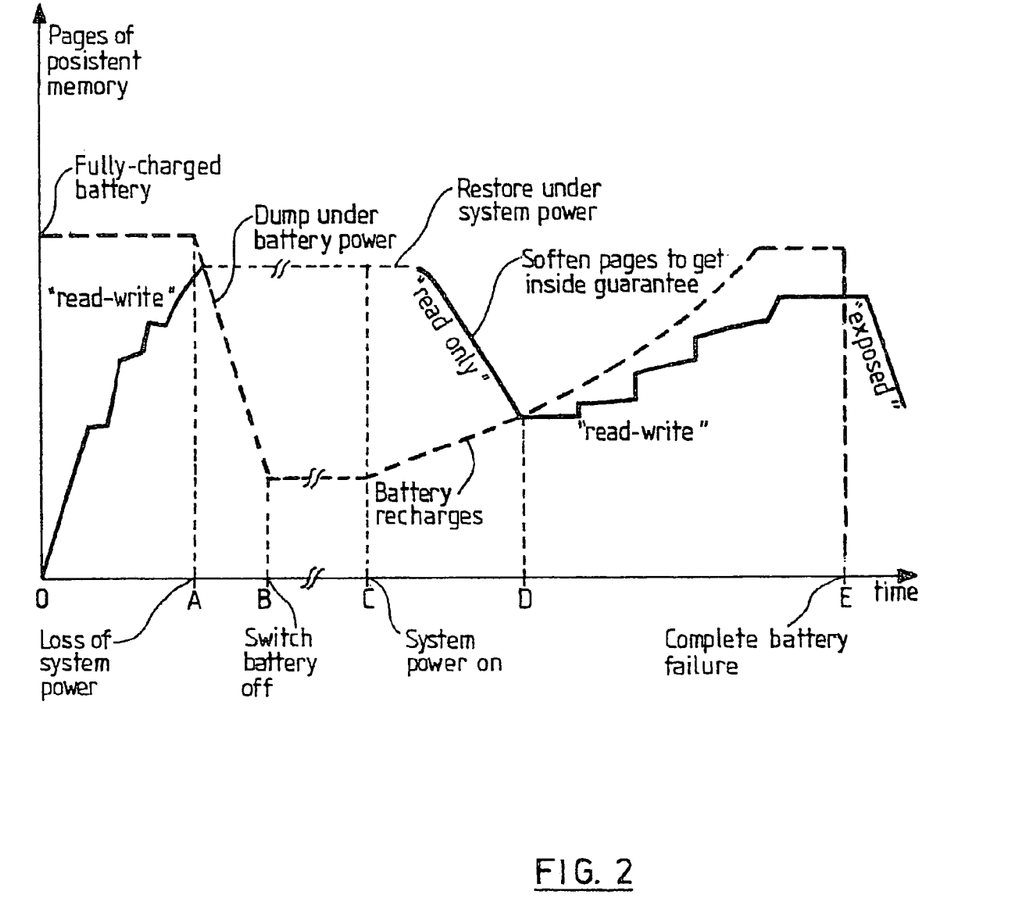
FIG. 2 is a graph illustrating the operation of the storage adapter of FIG. 1.

FIG. 2 illustrates the operation of the storage adapter 1 in this manner. FIG. 2 is a graph showing the amount of hardened data (in terms of the number of pages of persistent or hardened memory) along the y-axis against time along the x-axis. The solid line in FIG. 2 is the actual number of hardened pages in the volatile memory 5 at the time indicated. The dashed line is the number of memory pages that the system can guarantee to preserve, given the charge in the battery, at the time indicated (which guarantee amount is, as discussed above, determined based on a conservative estimate of the charge in the battery and the data that can be written to the dump device 6 using that charge.)

In the example shown in FIG. 2, the system starts at time zero in a state with the battery 10 fully charged. The number of memory pages that the system can guarantee to preserve is therefore at its maximum level, and the system is accordingly placed in a "read write" state, whereby firmware client components of the subsystem can harden and soften their data in the volatile memory 5 as they like subject to the guaranteed level of hardened data not being exceeded.

At time A, a loss of system power occurs, and accordingly the storage adapter 1 operates to dump the hardened data stored in the volatile memory 5 to the nonvolatile dump device 6 using the battery 10. Once the data dump finishes, the battery 10 is switched off at time B. The nonvolatile memory 6 is marked as being "valid", indicating that it now stores a copy of data that is to be preserved and has not yet safely been restored.

A consequence of this data dump under battery power is that the remaining power capacity of the battery 10 is reduced, and as such the number of memory pages that can be protected by the battery (i.e. the guarantee) is reduced, as shown by the dashed line in FIG. 2. In this example, the data dump took place when there was almost the maximum amount of hardened pages in the volatile memory 5, and so the data dump accordingly took a significant amount of charge in the battery and so the guarantee is considerably reduced (although other situations would, of course, be possible).

When system power returns at time C, the hardened memory pages dumped to the dump device are copied back to the volatile memory 5 (i.e. restored). However, as shown in FIG. 2, the number of hardened pages will then exceed the guarantee. The volatile memory 5 is accordingly placed in a "read only" state for hardened data, such that the storage subsystem's firmware client components cannot harden new pages or modify the content of the current hardened pages. However, firmware client components of the subsystem can (and indeed are instructed to) soften memory pages to reduce their hardened pages towards the new guarantee.

The system is placed in a "read only" state in these circumstances because if there is another power failure whilst the number of hardened pages exceeds the guarantee, then the original hardened pages can still be restored from the dump device (since they are still stored there), and so preventing new "hardened" data being written to the volatile memory (which new data could then be lost if there was another power supply failure, as all of the hardened data could not be dumped again (as the temporary power supply would have insufficient capacity to do so)) ensures that any data marked as hardened can still safely be restored in the event of a second power supply failure.

It will be appreciated from this that another power failure in the "read only" state results in the same data as was previously restored being restored to the volatile memory 5 from the dump device 6.

As shown in FIG. 2, as the battery recharges, the guarantee increases, and once the guarantee has again risen above the number of hardened pages in the volatile memory 5, the system can return to the read/write state for hardened data, albeit with a reduced quantity of hardenable data, as shown at time D in FIG. 2. At this point the nonvolatile memory 6 can also be marked as "invalid", indicating that its contents no longer need to be preserved and so can be safely written over.

FIG. 2 finally illustrates the unusual situation of a complete battery failure at time E. In this case, the guarantee immediately drops because of the battery failure. Such a drop in the guarantee could also occur, if there is, e.g., a re-estimation of the battery's capacity due to aging. In this situation, because there is not already a copy of the hardened data stored on the dump device 6 (unlike in the situation where a power supply failure has occurred), a main power failure would cause data loss (since the battery can no longer protect all the hardened data), and so the system is "exposed", and client components must soften their hardened data immediately.

Figure 3:
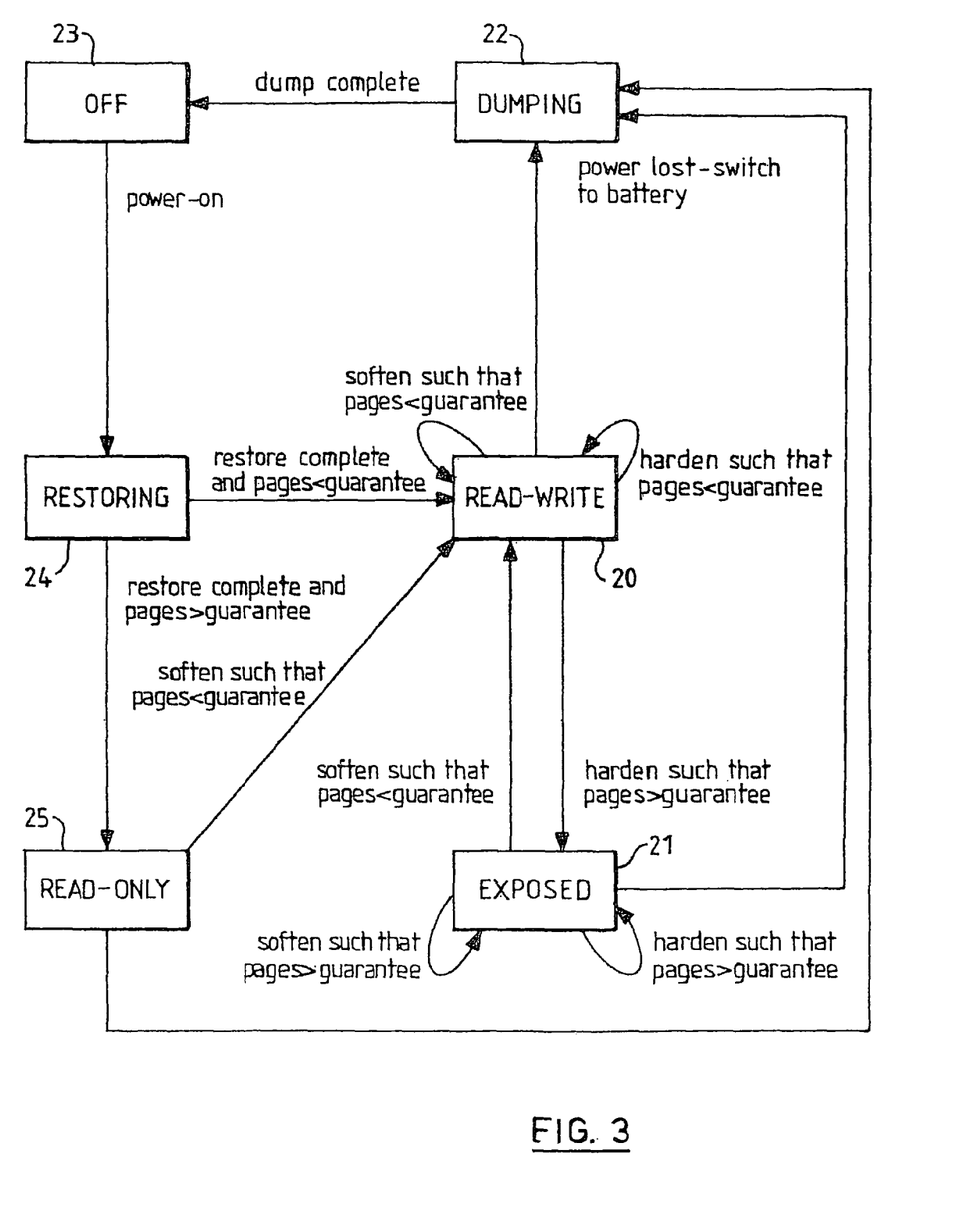
FIG. 3 is a state diagram showing the possible states of the storage adapter shown in FIG. 1.

FIG. 3 is a state diagram that shows schematically the various possible states of the storage adapter 1. Thus, for example, when the storage adapter is in the read/write state 20, it is permitted to harden and soften memory pages so long as the number of hardened pages remains below the guarantee. Should the pages be hardened such that the number of hardened pages exceeds the guarantee, then the system enters the exposed state 21, and will remain in that state until such time as sufficient pages have been softened that the number of hardened pages is less than the guarantee, in which case the system can return to the read/write state 20.

When main power is lost, the system switches to the "dumping" state 22, where hardened data is dumped from the volatile memory 5 to the nonvolatile memory 6 using the battery supply. Once a dump is complete, the system moves to the off state 23, until the main power supply is restored, at which point the system moves to the restoring state 24, where the preserved data stored in the dump device 6 is restored to the volatile memory 5.

Once the restore is complete and the number of hardened pages is less than the guarantee, then the system can return to the read/write state 20. On the other hand, if once the restore is complete, the number of hardened pages exceeds the guarantee, then the system enters the "read only" state 25, and client components soften their pages until the number of hardened pages is less than the guarantee, at which point the system can return to the read/write state 20.

As can be seen from the above, there is a set, finite amount of hardenable data that is permitted to be stored in the volatile memory 5 at any given time. Furthermore, this persistent memory capacity varies with time, and there are times, for example when the system is in the "read only" state, where the amount of hardened data currently in the volatile memory 5 exceeds the amount of such data that can be protected (such that, accordingly, the firmware client components of the subsystem will need to soften their hardened data to reduce the amount of hardened data down to the new, lower guarantee). In the present embodiment, as will be described below, the available persistent memory is allocated between firmware client components of the storage subsystem in an advantageous manner, in accordance with the present invention.

It will be assumed for the purposes of this embodiment that the storage subsystem contains a number of independent software layers that are part of the storage subsystem firmware, such as copy services, caching and RAID storage, each of which may need to use hardenable memory and each of which can be considered to be a firmware "client component" of the storage subsystem. As is known in the art, each of these software layers can be considered to be effectively stacked one on top of each other, with each layer effectively operating to write to the layer or layers below. Each layer will also typically need access to sufficient hardenable memory to, e.g., process one input/output request or risk becoming deadlocked (which can then, e.g., deadlock the layers above it as well).

To reduce the risk of such deadlocks occurring, the available hardened memory capacity is in this embodiment divided between these client components of the storage subsystem as follows. Firstly, when there is a full quota of hardenable memory capacity (i.e. the battery 10 is fully charged), then each firmware client component of the subsystem is allocated a predetermined static quota of hardenable memory capacity for its use. However, when the available amount of hardenable memory capacity is restricted (i.e. less than the maximum value), then the various client components have their requirements satisfied in a predetermined priority order.

The priority order basically is arranged so as firstly to provide client components who require hardenable memory to ensure data integrity with their hardenable memory capacity requirement first. Once those client components have their hardened memory capacity requirements satisfied, then those client components that require hardenable memory for increased performance are allocated any "spare" hardenable memory in an order which enables the best performance.

The priority order for the allocation of available hardenable memory is also based on the dependencies between client components when softening their hardenable memory. Thus, for example, where firmware client components of the storage subsystem are dependent upon the ability of other client components to process their input/output requests before they themselves can process their input/output requests, the available hardenable memory is first allocated to those client components who if given access to that hardenable memory will then allow other client components to soften their own hardenable memory, as this accelerates the overall softening of the "excess" hardenable memory. Thus, for example, if client component X is dependent on client component Y to successfully soften its persistent memory, then client component Y is given the higher priority for the available hardenable memory.

Thus in this embodiment, the lower layers in the "client component" stack are given preferential access to the hardenable memory, so as to reduce the risk of a deadlock situation where the bottom layer in the stack does not have the ability to process writes because it cannot modify hardenable memory (because its quantity of hardened memory exceeds its guarantee) whilst the upper layers do have some or all of the limited hardenable memory guarantee, but still cannot perform input/output operations because they need the lower layers to process their input/output operations first.

Thus, considering the above examples of firmware client components of the data storage subsystem of cache, flash copy and RAID5 APU, of these client components, RAID5 APU requires at least some hardenable memory before it can operate, flash copy will perform slowly without hardenable memory, and cache does not require hardenable memory. Thus, these client components are in the present embodiment placed in the following priority order for hardenable memory (with the highest priority first): RAID5 APU, flash copy and cache.

Thus, in this embodiment, when all the client components that require hardenable memory to ensure data integrity have had their requirements satisfied, the dependent client components can then start using them to help soften their hardenable memory, and as the hardenable memory pool increases, any remaining dependent client components who require hardenable memory for increased performance can be allocated increasing quantities of hardenable memory in an order which enables the best performance.

The effect of this is that the available hardenable memory pool is assigned in a priority order which best enables the users of the hardenable memory to soften the hardenable memory more quickly, and accordingly reduce the overall quantity of hardened memory more quickly towards the available guaranteed amount of hardened memory that the system can support. This facilitates, for example, the system returning to a "read write state" for hardened data from a "read-only" state as quickly as possible, by allocating the available hardened memory on an appropriate priority basis.

The present invention has application wherever persistent (hardenable) memory may be required, such as in most storage subsystems and in applications such as write caching, RAID5 atomic parity updating and copy services.

As can be seen from the above, the present invention provides, in its preferred embodiments at least, a priority scheme for dynamically allocating a finite amount of persistent memory between multiple client components using that memory, such that each client component has its own (varying) allocation of the available persistent memory. In preferred embodiments, a higher priority for the available persistent memory is given to client components on which other client components depend, such as lower layers of the software stack, thereby allowing them to get a larger share of the available persistent memory when needed and complete their input/output requests faster. This allows the corresponding persistent memory to then be freed back to the pool more quickly. The present invention is accordingly particularly advantageous where there is a shortage or suddenly reduced capacity of persistent memory.

The invention claimed is:

1. A method of operating a data storage subsystem, said method comprising:
    allocating less than all of a volatile memory for storing hardened data to be preserved in the event of power interruption to said data storage subsystem;
    in response to a power loss to said data storage subsystem, transferring said hardened data from said volatile memory to a non-volatile memory, wherein said volatile memory and said non-volatile memory are powered by a battery during said data transfer; and
    in response to a power restore to said data storage subsystem after said power loss,
        permitting said hardened data within said volatile memory only to be read when not all of said hardened data in said volatile memory are guaranteed to be backup to said non-volatile memory in case of another power loss while said battery is being recharged; and
        permitting said hardened data within said volatile memory to be read or written when all of said hardened data in said volatile memory are guaranteed to be backup to said non-volatile memory in case of another power loss while said battery is being recharged.

2. The method of claim 1, wherein said volatile memory is a static random access memory device.

3. The method of claim 1, wherein said non-volatile memory is a compact flash device.

4. The method of claim 1, wherein said method further includes removing battery power from said volatile memory and said non-volatile memory after said data transfer until said power restore has occurred.

5. A non-transitory computer usable medium having a computer program product for controlling a data storage subsystem, said non-transitory computer usable medium comprising:
    computer program code for allocating less than all of a volatile memory for storing hardened data to be preserved in the event of power interruption to said data storage subsystem;
    computer program code for, in response to a power loss to said data storage subsystem, transferring said hardened data from said volatile memory to a non-volatile memory, wherein said volatile memory and said non-volatile memory are powered by a battery during said data transfer; and
    computer program code for, in response to a power restore to said data storage subsystem after said power loss, permitting said hardened data within said volatile memory only to be read when not all of said hardened data in said volatile memory are guaranteed to be backup to said non-volatile memory in case of another power loss while said battery is being recharged; and
    permitting said hardened data within said volatile memory to be read or written when all of said hardened data in said volatile memory are guaranteed to be backup to said non-volatile memory in case of another power loss while said battery is being recharged.

6. The non-transitory computer usable medium of claim 5, wherein said volatile memory is a static random access memory device and said non-volatile memory is a compact flash device.

7. The non-transitory computer usable medium of claim 5, wherein said computer usable medium further includes computer program code for removing battery power from said volatile memory and said non-volatile memory after said data transfer until said power restore has occurred.

* * * * *